UNITED STATES PATENT OFFICE.

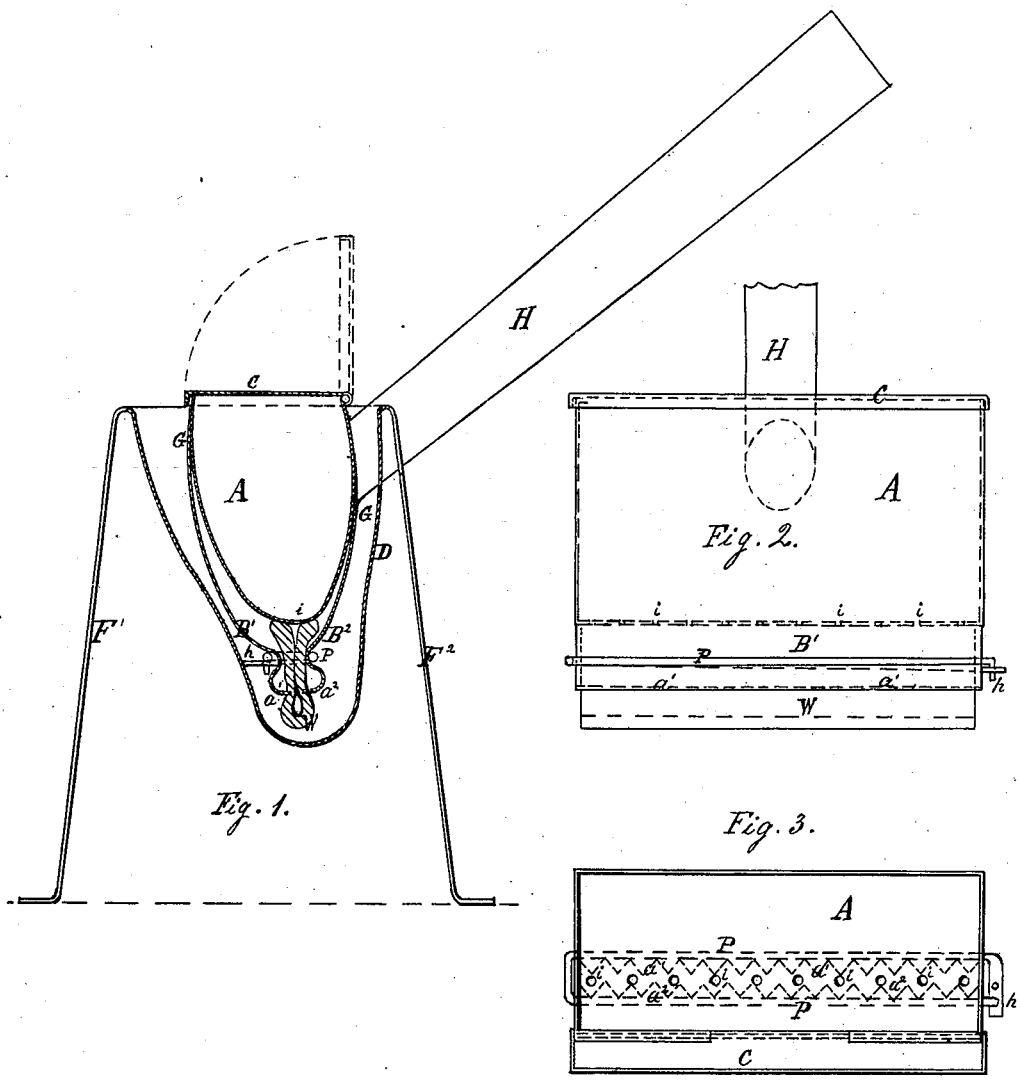

MOSES NICHOLS, OF NEWBURG, NEW YORK, ASSIGNOR OF ONE-HALF HIS RIGHT TO I. L. SLOAT, OF SAME PLACE.

IMPROVEMENT IN GRIDDLE GREASER AND HOLDER.

Specification forming part of Letters Patent No. 199,929, dated February 5, 1878; application filed January 17, 1878.

*To all whom it may concern:*

Be it known that I, MOSES NICHOLS, of Newburg, in the county of Orange and State of New York, have invented an Improvement in Griddle Greaser and Holder, of which the following is a specification:

The object of my invention is to manufacture a handy instrument with which to grease griddles, pans, &c., consisting of a vessel containing the fatty substance and of other attachments by which to distribute this substance over the griddle for baking cakes, &c., in the kitchen.

My invention is illustrated more in detail in the accompanying drawings, in which Figure 1 is a longitudinal section. Fig. 2 represents a side view; Fig. 3, a plan of the same.

A represents a vessel or receptacle for the fatty substance, such as lard, butter, &c., which is to be used in the kitchen for baking griddle-cakes, &c. C is the lid to cover the same, hinged at one side. The bottom of the vessel, which is rounded, is perforated by one or more rows of small holes, $i$ $i$, to let the fat run out when sufficiently melted. To the sides G G of the vessel A are soldered or otherwise fastened two sheets of tin, $B^1$ $B^2$, the whole length of the vessel, which act like springs, and which are bent at the lower ends $a^1$ $a^2$ in the shape of tongs, with the edges cut out like saw-teeth, Fig. 3. Between these edges is inserted a piece of lamp-wick, doubled up, running the whole length of those fangs, touching the bottom of the vessel A. Instead of lamp-wick, any other porous cloth or suitable substance may be used. This cloth is held in place by the tooth-shaped edges $a^1$ $a^2$ being pressed in the cloth, and held there by a wire clamp, P, being put around the lower narrow part of the springs $B^1$ $B^2$, and held there by a hook or otherwise, which can easily be removed, so that the cloth can be taken out to be cleaned or to be renewed.

To the one side of the vessel A is fastened a suitable handle, H, so that the vessel A can be taken up, and, with the cloth W, which becomes saturated with the fatty substance, put in the vessel. When brought near to or in contact with the hot griddle or pan, the iron is to be rubbed over, the same as is done now, by a piece of bacon or fat meat, or butter on the knife, until it is greasy enough for baking.

To deposit the instrument, after using it, in a handy and safe place without upsetting it or letting the grease run off, I have constructed a stand, made of tin, as shown in Fig. 1, of suitable shape to receive the greaser. The body D of this stand is closed on the sides, so that it may retain any grease that may run through the cloth W after it has been used. It may have a cover or lid, or not, and the legs $F^1$ $F^2$ are shaped so as to support the greaser safely in an upright position.

It is immaterial what shape or form the vessel A may have, or what kind of metal is used in manufacturing the same; but

What I claim as my invention, and desire to secure by Letters Patent, is—

1. The griddle-greaser consisting of a vessel, A, with perforated bottom $i$ $i$, springs or clamps $B^1$ $B^2$, for holding the cloth W, handle H, lid C, and clamp P, substantially as and for the purpose specified.

2. The stand D $F^1$ $F^2$, in combination with the greaser A, substantially as specified.

MOSES NICHOLS.

Witnesses:
JOHN L. SLOAT,
J. W. GERECKE.